United States Patent
Terada et al.

(10) Patent No.: US 9,238,444 B2
(45) Date of Patent: Jan. 19, 2016

(54) BUMPER REINFORCEMENT

(71) Applicants: NIKKEIKIN ALUMINIUM CORE TECHNOLOGY COMPANY LTD., Shinagawa-ku, Tokyo (JP); NIPPON LIGHT METAL COMPANY, LTD., Shinagawa-ku, Tokyo (JP)

(72) Inventors: Taichi Terada, Shizuoka (JP); Shigenori Saito, Tokyo (JP); Shoji Mochizuki, Shizuoka (JP)

(73) Assignees: Nikkeikin aluminum Core Technology, Shinagawa-ku, Tokyo (JP); Nippon Light Metal Company, Ltd., Shinagawa-ku, Tokyo (JP)

( * ) Notice: Subject to any disclaimer, the term of this patent is extended or adjusted under 35 U.S.C. 154(b) by 0 days.

(21) Appl. No.: 14/387,062
(22) PCT Filed: Mar. 8, 2013
(86) PCT No.: PCT/JP2013/056544
§ 371 (c)(1),
(2) Date: Sep. 22, 2014
(87) PCT Pub. No.: WO2013/141049
PCT Pub. Date: Sep. 26, 2013

(65) Prior Publication Data
US 2015/0084355 A1 Mar. 26, 2015

(30) Foreign Application Priority Data
Mar. 22, 2012 (JP) .................. 2012-064915

(51) Int. Cl.
B60R 19/02 (2006.01)
B60R 19/18 (2006.01)
(52) U.S. Cl.
CPC ........... B60R 19/18 (2013.01); *B60R 2019/182* (2013.01)
(58) Field of Classification Search
CPC .... B01D 27/08; B01D 35/147; B01D 27/103; B01D 35/15; B61D 45/007; B60R 19/18; B60R 19/48; B60R 2019/1886; E05F 5/06; A63H 17/02

USPC ............ 293/102, 1, 117, 120, 121, 122, 126, 293/136
See application file for complete search history.

(56) References Cited

U.S. PATENT DOCUMENTS 4,525,005 A * 6/1985 Prochaska ................ B60D 1/06
293/117
4,597,601 A * 7/1986 Manning ................. B60R 19/18
293/122

(Continued)

FOREIGN PATENT DOCUMENTS

JP H11170935 A 6/1999
JP 2001-227573 8/2001

(Continued)

OTHER PUBLICATIONS

International Search Report for International Application No. PCT/JP2013/056544 mailed Jun. 11, 2013 (7 pages).

(Continued)

*Primary Examiner* — Kiran B Patel
(74) *Attorney, Agent, or Firm* — Merchant & Gould P.C.

(57) ABSTRACT

The present invention provides a bumper reinforcement made of a hollow material, including: a rear wall facing a vehicle body; an upper wall extending forward from a top of the rear wall; a lower wall extending forward from a bottom of the rear wall; a front wall supported only by the upper wall and the lower wall; an upper reinforcing wall extending from a middle in a height direction of the rear wall up to a middle in a front-rear direction of the upper wall; and a lower reinforcing wall extending from the middle in the height direction of the rear wall up to a middle in the front-rear direction of the lower wall, wherein: the front wall is located frontward of a virtual line passing through a foremost of the upper reinforcing wall and a foremost of the lower reinforcing wall in a cross section.

13 Claims, 13 Drawing Sheets

(56) References Cited

U.S. PATENT DOCUMENTS

| | | | | |
|---|---|---|---|---|
| 4,830,416 | A * | 5/1989 | Matsuoka | B60R 19/18 293/120 |
| 5,340,178 | A * | 8/1994 | Stewart | B60R 19/18 293/122 |
| 6,138,429 | A * | 10/2000 | Baumgaertner | B62D 21/152 29/897.2 |
| 6,481,690 | B2 * | 11/2002 | Kariatsumari | B60R 19/18 293/102 |
| 6,767,650 | B2 * | 7/2004 | Hausberger | B60R 19/18 293/102 |
| 6,923,482 | B2 * | 8/2005 | Cumming | B60R 19/18 293/102 |
| 7,210,717 | B1 * | 5/2007 | Baccouche | B60R 19/18 293/102 |
| 8,047,588 | B2 * | 11/2011 | Fang | B60R 19/34 293/132 |
| 8,201,861 | B2 * | 6/2012 | Handing | B60R 19/18 293/132 |
| 8,408,632 | B2 * | 4/2013 | Shimotsu | B60R 19/18 296/102 |
| 8,419,091 | B2 * | 4/2013 | Roll | B60R 19/04 293/120 |
| 2005/0082850 | A1 * | 4/2005 | Reierson | B60R 19/18 293/102 |
| 2007/0228747 | A1 * | 10/2007 | Hodoya | B60R 19/18 293/102 |
| 2008/0217934 | A1 * | 9/2008 | Hori | B60R 19/18 293/102 |
| 2008/0284183 | A1 * | 11/2008 | Johnson | B60R 19/18 293/102 |
| 2008/0296919 | A1 * | 12/2008 | Agrahari | B60R 19/18 293/122 |
| 2010/0194127 | A1 * | 8/2010 | Muller | B60R 19/18 293/133 |
| 2010/0201139 | A1 * | 8/2010 | Hashimura | B60R 19/18 293/133 |
| 2011/0012381 | A1 * | 1/2011 | Saito | B60R 19/18 293/133 |
| 2012/0043772 | A1 * | 2/2012 | Kinefuchi | B60R 19/03 293/102 |
| 2012/0074720 | A1 * | 3/2012 | Johnson | B21D 5/086 293/102 |
| 2013/0168982 | A1 * | 7/2013 | Ashiya | B60R 19/18 293/108 |
| 2015/0097384 | A1 * | 4/2015 | Conrod | B21B 15/0007 293/102 |
| 2015/0108775 | A1 * | 4/2015 | Nakanishi | B60R 19/34 293/133 |
| 2015/0115632 | A1 * | 4/2015 | Iino | B60R 19/18 293/120 |

FOREIGN PATENT DOCUMENTS

| | | |
|---|---|---|
| JP | 2003-182481 | 7/2003 |
| JP | 2009-262691 | 11/2009 |
| WO | WO 2007/110938 | 4/2007 |
| WO | WO 2009/110461 | 11/2009 |

OTHER PUBLICATIONS

Japanese Office Action for JP Application No. 2012-064915 mailed Jun. 9, 2015 (4 pages).

* cited by examiner

BUMPER REINFORCEMENT

This application is a National Stage Application of PCT/JP2013/056544, filed 8 Mar. 2013, which claims benefit of Serial No. 2012-064915, filed 22 Mar. 2012 in Japan and which applications are incorporated herein by reference. To the extent appropriate, a claim of priority is made to each of the above disclosed applications.

TECHNICAL FIELD

The present invention relates to a bumper reinforcement.

BACKGROUND ART

Each of WO2007/110938 and WO2009/110461 (hereinafter referred to respectively as Patent Documents 1 and 2) discloses a vehicle bumper structure which includes a hollow bumper reinforcement and a pair of right and left bumper stays supporting the hollow bumper reinforcement. This bumper structure: absorbs collision energy during a process in which the bumper reinforcement undergoes bending deformation (hereinafter referred to as a "beam deflection process"); absorbs collision energy during a process in which the bumper stays break into the bumper reinforcement (hereinafter referred to as a "beam crushing process; and absorbs collision energy during a process in which the bumper stays are crushed (hereinafter referred to as a "stay crushing process"). Such a bumper structure can increase the amount of collision energy absorbed while lowering the peak of the collision reaction force, and as a result, can reduce a damage to the vehicle body, while preventing malfunctions of safety apparatus (such as, for example, an air-bag) on a light collision. In addition, in a beam deflection process of a bumper reinforcement having a bent portion or a curved portion, collision energy is absorbed during a process in which the bent portion or the curved portion is rectilinearly extended.

The bumper reinforcement of each of Patent Documents 1, 2 includes: a rectangular outer shell; and a partition that partitions the inner space formed within the outer shell into an upper space and a lower space. The partition is provided parallel to the upper wall and the lower wall of the outer shell in a manner to join the front wall with the rear wall. The provision of the partition increases the section stiffness of the bumper reinforcement. Accordingly, it is possible to reduce the wall thickness and thus the weight of the bumper reinforcement without reducing the amount of collision energy absorbed.

RELATED ART DOCUMENTS

Patent Documents

Patent Document 1: WO2007/110938
Patent Document 2: WO2009/110461

SUMMARY OF THE INVENTION

Problem to be Solved by the Invention

Bumper reinforcements having cross sections like those of the bumper reinforcements of Patent Documents 1, 2 have the above-mentioned merits. Those bumper reinforcements, however, thanks to their increased section stiffness, tend to provide a sharp increase in the collision reaction force in an early stage of collision, which in some cases, makes the bumper reinforcements fall short of design requirements.

It is an object of the present invention to provide a bumper reinforcement that can reduce the gradient of the collision reaction force in an early stage of collision.

Means to Solve the Problem

In one aspect, the present invention provides a bumper reinforcement made of a hollow material. The bumper reinforcement includes: a rear wall facing a vehicle body; an upper wall extending forward from a top of the rear wall; a lower wall extending forward from a bottom of the rear wall; a front wall supported only by the upper wall and the lower wall; an upper reinforcing wall extending from a middle in a height direction of the rear wall up to a middle in a front-rear direction of the upper wall; and a lower reinforcing wall extending from the middle in the height direction of the rear wall up to a middle in the front-rear direction of the lower wall. The front wall is located frontward of a virtual line passing through a foremost of the upper reinforcing wall and a foremost of the lower reinforcing wall in a cross section obtained by cutting the hollow material along a virtual plane having a central axis of the hollow material as a normal line.

In another aspect, the present invention provides a bumper reinforcement made of a hollow material. The bumper reinforcement includes: a rear wall facing the vehicle body; an upper wall extending forward from a top of the rear wall; a lower wall extending forward from a bottom of the rear wall; a front wall supported only by the upper wall and the lower wall; a middle reinforcing wall extending forward from a middle in a height direction of the rear wall; an upper reinforcing wall extending from a front edge of the middle reinforcing wall up to a middle in a front-rear direction of the upper wall; a lower reinforcing wall extending from the front edge of the middle reinforcing wall up to a middle in the front-rear direction of the lower wall. The front wall is located frontward of a virtual line passing through a foremost of the upper reinforcing wall and a foremost of the lower reinforcing wall in a cross section obtained by cutting the hollow material along a virtual plane having a central axis of the hollow material as a normal line.

In an another aspect, the present invention provides a bumper reinforcement made of a hollow material. The bumper reinforcement includes: a rear wall facing the vehicle body; an upper wall extending forward from a top of the rear wall; a lower wall extending from a bottom of the rear wall; a front wall supported only by the upper wall and the lower wall; an upper reinforcing wall extending from the rear wall up to a middle in a front-rear direction of the upper wall; and a lower reinforcing wall extending the rear wall up to a middle in the front-rear direction of the lower wall. The upper reinforcing wall is located above the upper wall. The lower reinforcing wall is located underneath the lower wall. The front wall is located frontward of a virtual line passing through a foremost of the upper reinforcing wall and a foremost of the lower reinforcing wall in a cross section obtained by cutting the hollow material along a virtual plane having a central axis of the hollow material as a normal line.

As used herein, the direction away from the vehicle body is a direction to the "front". Accordingly, if the bumper reinforcement of the present invention is applied to a front bumper, the direction to which the vehicle advances is the direction to the "front", and if it is applied to a rear bumper, the direction to which the vehicle reverses is the direction to the "front".

According to the present invention, since an unpartitioned space (hereinafter referred to as a "primary crushing space V1") is formed between the front wall and the virtual line (an imaginary line passing through the foremost of the upper reinforcing wall and the foremost of the lower reinforcing wall), the front half portion of the bumper reinforcement can be made less rigid, compared to a case where a central portion in the height direction of the front wall is supported by a partition wall. In other words, according to the present invention, the primary crushing space (the space formed between the front wall and the virtual line) is crushed promptly and preferentially in the early stage of collision. This allows lowering of the peak of the collision reaction force and further, a reduction in the gradient of the collision reaction force (the inclination of the collision reaction force-displacement curve).

Further, in a case where a collision load acts on a location vertically offset from the center (hereinafter referred to as a "vertically offset collision"), the upper or lower portion of the primary crushing space V1 is crushed and thereby collision energy in the early stage of collision is absorbed. Furthermore, the presence of a space enclosed with the rear wall, the upper wall, and the upper reinforcing wall (hereinafter referred to as an "upper secondary crushing space") or of a space enclosed with the rear wall, the lower wall, and the lower reinforcing wall (hereinafter referred to as a "lower secondary crushing space") increases the torsional rigidity of the bumper reinforcement, so that the bumper reinforcement can bear the collision load even after the crushing of the primary crushing space. As a result, the occurrences of a phenomenon that the bumper reinforcement R1 gets under the collided object and a phenomenon that it rides over the collided object can be reduced, and in consequence, energy absorption through the beam deflection process becomes feasible.

Preferably, an intersection of the upper wall and the upper reinforcing wall and an intersection of the lower wall and the lower reinforcing wall are located rearward of the virtual line. In such a case, the upper-wall front portion and the lower-wall front portion have longer buckling lengths and are easier to buckle. This allows lowering of the peak of the collision reaction force effectively and a reduction in the gradient of the collision reaction force in the early stage of collision.

The upper reinforcing wall and the lower reinforcing wall may be unbent (straight) in cross section. Preferably, however, these walls are curved or bent in cross section for reducing the gradient of the collision reaction force.

Further, the entire upper and lower reinforcing walls may be curved in cross section. This, however, may result in an excessive reduction in the section stiffness of the bumper reinforcement and thus in the amount of energy absorbed. Accordingly, the upper reinforcing wall includes: an upper flat portion extending forward from the rear wall; and an upper curved portion extending from a front edge of the upper flat portion up to the upper wall, and the lower reinforcing wall includes: a lower flat portion located underneath the upper flat portion and extending forward from the rear wall; and a lower curved portion extending from a front edge of the lower flat portion up to the lower wall.

Moreover, preferably, the upper curved portion and the lower curved portion are each shaped in an arc curving outwardly toward the front wall. In such a case, the upper reinforcing wall and the lower reinforcing wall each have a higher second moment of area. That is, the rear half portion of the bumper reinforcement is more difficult to crush and as a result, collision energy absorption in the "beam deflection process" is ensured.

The front wall may have a height smaller than a distance from an intersection of the upper wall and the upper reinforcing wall (hereinafter referred to as an "upper intersection") up to an intersection of the lower wall and the lower reinforcing wall (hereinafter referred to as a "lower intersection"). That is, an upper-wall front portion (a portion extending from the upper intersection up to the front wall) and the lower-wall front portion may be at least partially inclined downwardly, and also, a lower-wall front portion (a portion extending from the lower intersection up the front wall) may be at least partially inclined upwardly. In such a case, the primary crushing space can be crushed in an intended mode and a sufficient lap amount (contact area with the collided object) can be secured, even in the vertically offset collision.

That is, if a collision load acts on the upper portion of the bumper reinforcement by the vertically offset collision, the upper-wall front portion is deformed to come closer to the upper reinforcing wall, thereby causing the upper-wall rear portion (a portion extending from the rear wall up to the upper intersection) to be deformed to swell upwardly, and enabling securing of a sufficient lap amount.

If the collision load acts on the lower portion of the bumper reinforcement by the vertically offset collision, then the lower-wall front portion is deformed to come closer to the lower reinforcing wall, thereby causing the lower-wall rear portion (a portion extending from the rear wall up to the lower intersection) to be deformed to swell downwardly, and enabling securing of a sufficient lap amount.

The height of the front wall may be made larger than the distance from the upper intersection up to the lower intersection. That is, the upper-wall front portion and the lower-wall front portion may be at least partially inclined upwardly and downwardly respectively. In such a case, the primary crushing space can be crushed in an intended mode and a sufficient lap amount can be secured, even in the vertically offset collision.

That is, if a collision load acts on the upper portion of the bumper reinforcement by the vertically offset collision, the upper-wall front portion is deformed to swell upwardly. Accordingly, a sufficient lap amount (contact area with the collided object) can be secured even from the early stage of vertically offset collision onward.

If the collision load acts on the lower portion of the bumper reinforcement by the vertically offset collision, the lower-wall front portion is deformed to swell downwardly. Accordingly, a sufficient lap amount can be secured even from the early stage of vertically offset collision onward.

Although the front wall may be unbent (straight) in cross section, it may curved or bent in cross section. In such a case, the front wall can form such a contact area with the collided object that gradually becomes larger, which suppresses a sharp increase in the collision reaction force in the early stage of collision.

Effect of the Invention

The present invention can lower the peak of the collision reaction force in an early stage of collision and reduce the gradient of the collision reaction force.

BRIEF DESCRIPTION OF THE DRAWINGS

FIGS. 4A-4D are end views at the center in the vehicle width direction of the bumper reinforcement according to the first embodiment, and FIGS. 4E-4H are end views at the center in the vehicle width direction of a bumper reinforcement as a comparison example.

FIGS. 6A-6B are end views at the center in the vehicle width direction of the bumper reinforcement according to the first embodiment, and FIGS. 6C-6D are end views at the center in the vehicle width direction of the bumper reinforcement as a comparison example.

FIG. 8A is a cross sectional view, and FIG. 8B is a cross sectional view illustrating a mode of deformation at the time of the vertically offset collision.

DETAILED DESCRIPTION OF THE PREFERRED EMBODIMENTS

First Embodiment

Figure 1:
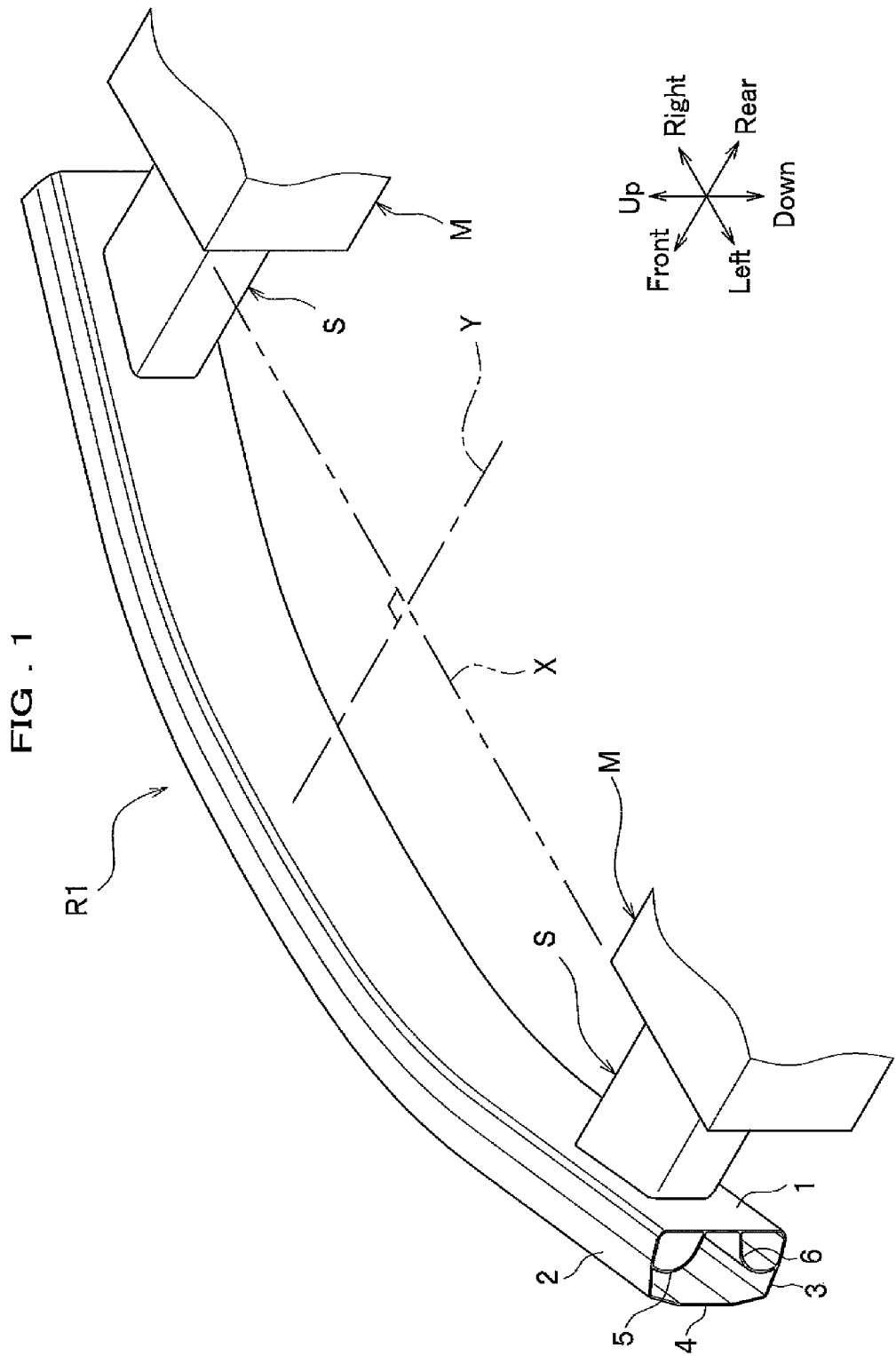
FIG. 1 is a perspective view of a bumper structure that includes a bumper reinforcement according to a first embodiment of the present invention.

A bumper reinforcement R1 according to a first embodiment of the present invention is a cross bar for constructing a front bumper for a vehicle. As illustrated in FIG. 1, the bumper reinforcement R1 is supported on a pair of right and left bumper stays S, S fixed to the front ends of side members M, M of the vehicle body.

As used herein, the terms "right-left", "front-rear", and "up-down" refer to those directions of the bumper reinforcement R1 in a state attached to the bumper stays S, S. That is, the "right-left direction" is used synonymously with the "vehicle width direction" and it is the direction along a virtual abscissa X connecting with each other the front ends of the side members M, M. The "front-rear direction" is used synonymously with the "vehicle moving direction" and it is the direction along a virtual ordinate Y orthogonal to the abscissa X.

Figure 2:
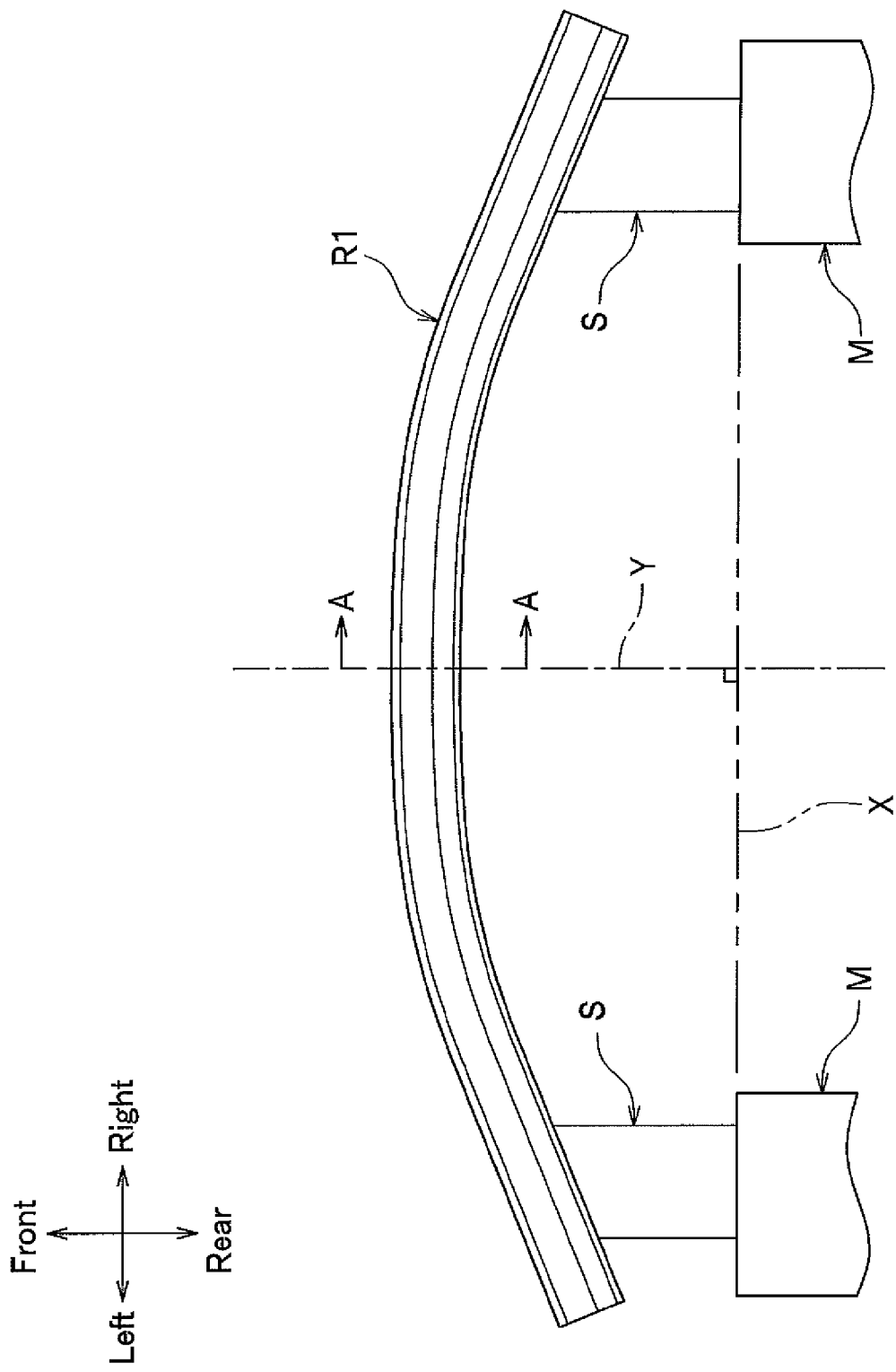
FIG. 2 is a plan view of the bumper structure illustrated in FIG. 1.

As illustrated in FIG. 2, for example, the bumper reinforcement R1 is curved outwardly forward so that it has a central axial line inclined relative to the abscissa X except at the center thereof in terms of the vehicle width direction. The bumper reinforcement R1 is arc-shaped in a plane (line) in the present embodiment, but may be rectilinear in a plane (line).

The bumper reinforcement R1 is made of a hollow extruded material of an aluminum alloy. The bumper reinforcement R1 is curved for example by pressing a bending mold onto the rear surface of a straight hollow extruded material which is to be the bumper reinforcement R1 while holding firmly the opposite end portions of the hollow extruded material.

Figure 3:
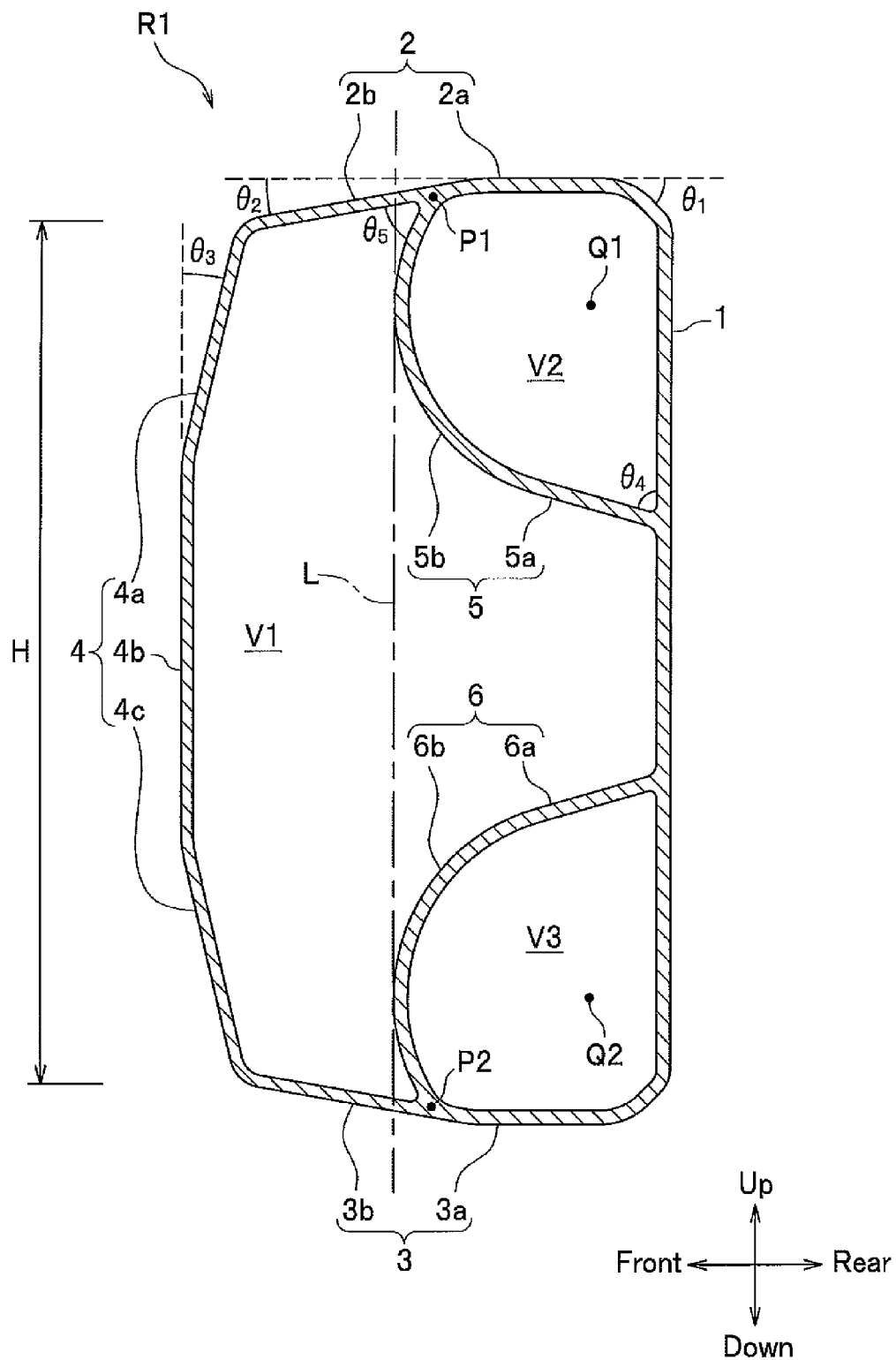
FIG. 3 is a cross sectional view taken along line A-A of FIG. 2.

FIG. 3 is a cross sectional view of the bumper reinforcement R1 taken along line A-A of FIG. 2 (a view obtained by cutting the hollow extruded material along a virtual plane having a central axis of the hollow extruded material as a normal line).

As illustrated in FIG. 3, the bumper reinforcement R1 includes: a rear wall 1 facing the vehicle body; an upper wall 2 extending forward from the top of the rear wall 1; a lower wall 3 extending forward from the bottom of the rear wall 1; a front wall 4 supported only by the upper wall 2 and the lower wall 3; an upper reinforcing wall 5 extending from the middle in the height direction of the rear wall 1 up to the middle in the front-rear direction of the upper wall 2; and a lower reinforcing wall 6 extending from the middle in the height direction of the rear wall 1 up to the middle in the front-rear direction of the lower wall 3.

In other words, the bumper reinforcement R1 includes: an outer shell having a closed cross section (the rear wall 1, the upper wall 2, the lower wall 3, and the front wall 4); and two partition walls arranged inside and partitioning the inner space of the outer shell into upper and lower spaces (the upper reinforcing wall 5 and the lower reinforcing wall 6). The rear wall 1, the upper wall 2, the lower wall 3, the front wall 4, the upper reinforcing wall 5, and the lower reinforcing wall 6 have the same thickness.

In FIG. 3, an alternate long and short dash line L is a straight line passing through the foremost of the upper reinforcing wall 5 and the foremost of the lower reinforcing wall 6 (hereinafter referred to as a "virtual line L"). A point P1 is an intersection of the upper wall 2 and the upper reinforcing wall 5 (hereinafter referred to as an "upper intersection P1") and a point P2 is an intersection of the lower wall 3 and the lower reinforcing wall 6 (hereinafter referred to as a "lower intersection P2").

The rear wall 1 is unbent in cross section (that is, extends straight and parallel to the vertical line). The rear wall 1 has a rear surface to which are fixed the front ends of bumper stays S, S, as illustrated in FIG. 1. The rear wall 1 may have an upper end portion extended upward further than the intersection with the upper wall 2 and a lower end portion extended downward further than the intersection with the lower wall 3 (illustration is omitted), so that the upper and lower end portions of the rear wall 1 can be used respectively as flanges extending upward from the upper wall 2 and downward from the lower wall 3.

The upper wall 2 includes: an upper-wall rear portion 2a extending from the upper edge of the rear wall 1 up to the upper intersection P1; and an upper-wall front portion 2b extending from the upper intersection P1 diagonally downward up to the front. In the present embodiment, of a portion extending from the top of the rear wall 1 up to the top of the front wall 4, a part forming a slit angle of 45 degrees or less relative to the horizontal plane is the upper wall 2.

The upper-wall rear portion 2a includes: a transition part arc-shaped in cross section extending diagonally upward to the front from the upper edge of the rear wall 1; a flat part shaped like a flat plate and extending along the horizontal plane from the front edge of the transition part; and an inclined part extending from the front edge of the flat part up to the upper intersection P1. The transition part forms a tilt angle $\theta_1$ of 45 degrees or less relative to the horizontal plane. The flat part forms a tilt angle of 0 degree relative the horizontal plane. The inclined part forms a tilt angle $\theta_2$ of 45 degrees or less (in the present embodiment, 10 degrees) relative to the horizontal plane.

The upper-wall front portion 2b is located on an extension of the inclined part of the upper-wall rear portion 2a and is shaped like a flat plate. The upper-wall front portion 2b forms a tilt angle $\theta_2$ of 45 degrees or less (in the present embodiment, 10 degrees) relative to the horizontal plane.

The lower wall 3 includes: a lower-wall rear portion 3a extending from the lower edge of the rear wall 1 up to the lower intersection P2; and a lower-wall front portion 3b extending from the lower intersection P2 diagonally upward to the front. In the present embodiment, of a portion extending from the bottom of the rear wall 1 up to the bottom of the front wall 4, a part forming a tilt angle of 45 degrees or less relative to the horizontal plane is the lower wall 3.

The lower wall 3 is identical in cross section to the upper wall 2 when inverted upside down. That is, the lower-wall rear portion 3a includes: a transition part arc-shaped in cross section extending from the lower edge of the rear wall 1 diagonally downward to the front; a flat part shaped like a flat plate extending along the horizontal plane from the front edge of the transition part; and an inclined part extending from the front edge of the flat part up to the lower intersection P2. The lower-wall front portion 3b is located on an extension of the inclined part of the lower-wall rear portion 3a and is shaped like a flat plate.

The front wall 4 is located frontward of the virtual line L and connects the upper wall 2 with the lower wall 3. A single unpartitioned space (a primary crushing space) V1 is formed between the front wall 4 and the virtual line L. The front wall 4 has a height H smaller than the distance between the upper intersection P1 on the upper side and the lower intersection P2 on the lower side.

The front wall 4 includes: a front-wall upper portion 4a extending from the front edge of the upper wall 2 diagonally downward to the front; a front-wall central portion 4b extending downward from the lower edge of the front-wall upper portion 4a; and a front-wall lower portion 4c extending from the lower edge of the front-wall central portion 4b diagonally downward to the rear. Thus, the front wall 4 is bent at two locations in the height direction.

The front-wall upper portion 4a faces the upper reinforcing wall 5. In cross section, the front-wall upper portion 4a is straight and unbent. The front-wall upper portion 4a forms a tilt angle $\theta_3$ of 45 degrees or less (in the present embodiment, 13 degrees) relative to the vertical line.

The front-wall central portion 4b faces the center in the height direction of the rear wall 1. The front-wall central portion 4b is straight and unbent, in cross section. The front-wall central portion 4b is parallel to the rear wall 1.

The front-wall lower portion 4c faces the lower reinforcing wall 6. The front-wall lower portion 4c is straight and unbent in cross section. The front-wall lower portion 4c forms a tilt angle of 45 degrees or less (in the present embodiment, 13 degrees) relative to the vertical line. The front-wall lower portion 4c is identical in cross section to the front-wall upper portion 4a when inverted upside down.

The front wall 4 may have an upper end portion extended upward further than the intersection with the upper wall 2 and may have a lower end portion extended downward further than the intersection with the lower wall 3 (not illustrated) so that the upper and lower end portions of the front wall 4 can be used respectively as flanges extending upward from the upper wall 2 and downward from the lower wall 3.

The upper reinforcing wall 5 includes: an upper flat portion 5a extending forward from the rear wall 1; and an upper curved portion 5b extending from the front edge of the upper flat portion 5a up to the upper wall 2.

The upper flat portion 5a is unbent in cross section, and extends diagonally upward to the front from the center in the height direction of the rear wall 1. The rear wall 1 and the upper flat portion 5a form an angle (an interior angle) $\theta_4$ of 90 degrees or less (in the present embodiment, 74 degrees). The upper flat portion 5a makes smooth transition to the upper curved portion 5b.

The upper curved portion 5b is curved in cross section, and intersects the upper wall 2 at a location rearward of the virtual line L. In other words, the upper intersection P1 is located rearward of the virtual line L. The upper-wall front portion 2b and the upper curved portion 5b form an angle (an interior angle) $\theta_5$ of less than 90 degrees. In cross section, the upper curved portion 5b is shaped in an arc curving outwardly toward the front wall 4. The arc in shape of the upper curved portion 5b is a circle segment with a center Q1 located within a space V2 enclosed with the rear wall 1, the upper-wall rear portion 2a, and the upper reinforcing wall 5 (hereinafter referred to as an "upper secondary crushing space V2"). The upper secondary crushing space V2 is a single unpartitioned space.

The lower reinforcing wall 6 includes: a lower flat portion 6a located underneath the upper flat portion 5a and extending forward from the rear wall 1; and a lower curved portion 6b extending from the front edge of the lower flat portion 6a up to the lower wall 3. The lower reinforcing wall 6 is identical in cross section to the upper reinforcing wall 5 when inverted upside down.

The lower flat portion 6a is unbent in cross section and extends diagonally downward to the front from the center in the height direction of the rear wall 1. The lower flat portion 6a faces the upper flat portion 5a with a distance apart therefrom vertically. The rear wall 1 and the lower flat portion 6a form an angle (an interior angle) of 90 degrees or less (in the present embodiment, 74 degrees). The lower flat portion 6a makes smooth transition to the lower curved portion 6b.

The lower curved portion 6b is curved in cross section, and intersects the lower wall 3 at a location rearward of the virtual line L. In other words, the lower intersection P2 is located rearward of the virtual line L. The lower-wall front portion 3b and the lower curved portion 6b form an angle (an interior angle) of less than 90 degrees. In cross section, the lower curved portion 6b is shaped in an arc curving outwardly toward the front wall 4. The arc in shape of the lower curved portion 6b is a circle segment with a center Q2 located within a space V3 enclosed with the rear wall 1, the lower-wall rear portion 3a, and the lower reinforcing wall 6 (hereinafter referred to as a "lower secondary crushing space V3"). The lower secondary crushing space V3 is a unpartitioned space.

Next, there will be described a process of energy absorption in a head-on collision, with reference to FIGS. 4A-5. Of these drawings, FIGS. 4E-4H are views illustrating deformation states of a bumper reinforcement R' as a comparison example. FIG. 5 shows a graph in which the amount of advancement of the vehicle body from the time of contact with the flat barrier is plotted on the abscissa and the collision reaction force is plotted on the ordinate, wherein the symbols (a)-(h) arranged along the abscissa respectively correspond to the deformation states illustrated in FIGS. 4A-4H.

Figure 4A:
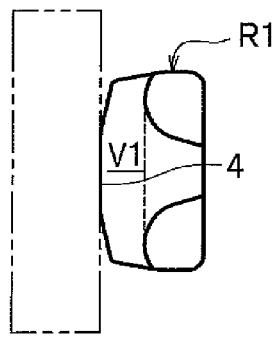
FIGS. 4A-4H are schematic views illustrating modes of deformation at the time of a collision with a flat barrier.
Figure 4E:
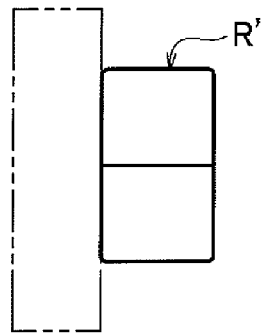
Figure 4B:
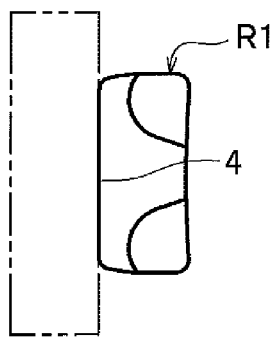
Figure 4F:
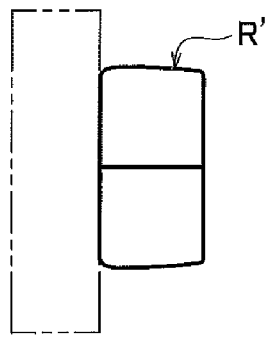
Figure 5:
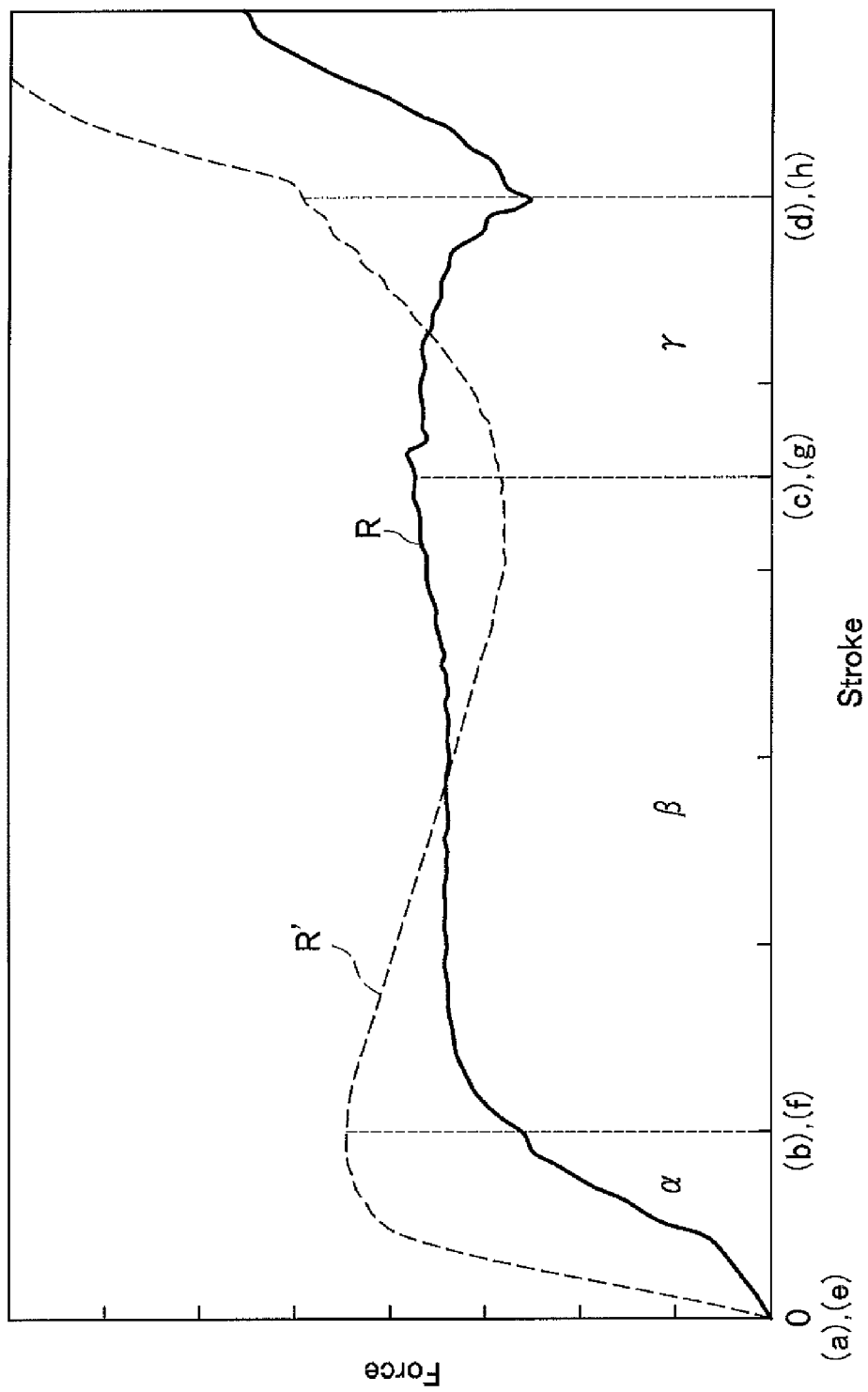
FIG. 5 shows a collision reaction force-displacement curve for the collision with the flat barrier.

As illustrated in FIG. 4A, when the bumper structure collides with a flat barrier and is subjected to a head-on collision load in the front-rear direction of the vehicle body, first, deformation occurs which rectilinearly extends the upper and lower bends of the front wall 4 that are formed respectively at the two locations in the height direction (that is, the boundaries respectively between the front-wall upper portion 4a and the front-wall central portion 4b and between the front-wall central portion 4b and the front-wall lower portion 4c, illustrated in FIG. 3) as illustrated in FIG. 4B, thereby causing collision energy to be absorbed. In other words, the slight crushing of the primary crushing space V1 in the central in the vehicle width direction of the bumper reinforcement R1 causes collision energy to be absorbed in the early stage of collision. Here, the amount of collision energy absorbed until the deformation state of FIG. 4B is reached is the integral value of the collision reaction force-displacement curve (that is area α in FIG. 5).

Figure 4C:
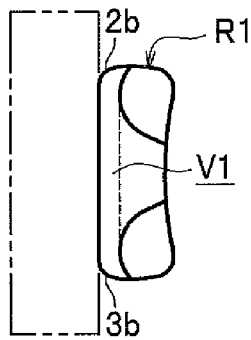
Figure 4G:
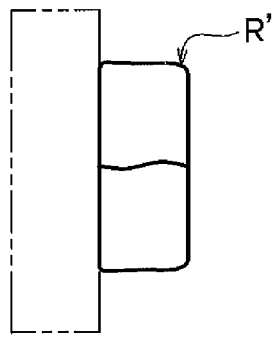
Figure 4D:
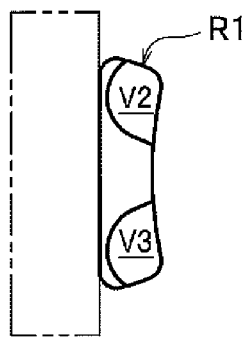
Figure 4H:
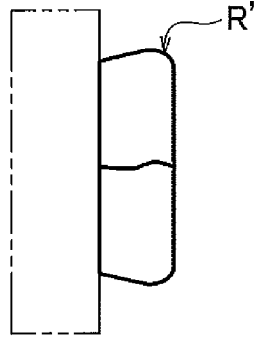

When the collision proceeds, as illustrated in FIGS. 4C and 4D, bending plastic deformation and buckling occurs to the upper-wall front portion 2b and the lower-wall front portion 3b, causing collision energy to be absorbed. In other words, further crushing of the primary crushing space V1 causes collision energy to be absorbed. The amount of collision energy absorbed from the deformation state of FIG. 4B to the deformation state of FIG. 4C is represented by area β illustrated in FIG. 5, and the amount of collision energy absorbed from the deformation state of FIG. 4C to the deformation state of FIG. 4D is represented by area γ illustrated in FIG. 5.

In the present embodiment, since the bumper reinforcement R1 is curved outwardly forward (see FIG. 2), the deformation in which the curve is extended rectilinearly (the beam deflection process) proceeds together with the crushing of the primary crushing space V1, whereby collision energy is absorbed.

When the collision proceeds to the state of FIG. 4D, a majority of the front half portion of the bumper reinforcement R1 (the primary crushing space V1) is crushed while the secondary crushing spaces V2, V3 are still retaining their original shapes without being severely crushed. As a result, the section stiffness of the bumper reinforcement R1 does not sharply drop after the crushing of the primary crushing space V1. If the section stiffness of a bumper reinforcement severely drops, there is a risk of V-shaped bending in a plan view of the bumper reinforcement and thus a risk of a sharp reduction in the collision reaction force. According to the bumper reinforcement R1 of the present embodiment, the outer shell of secondary crushing space V2 (the rear wall 1, the upper-wall rear portion 2a, and the upper reinforcing wall 5) and the outer shell of the secondary crushing space V3 (the rear wall 1, the lower-wall rear portion 3a, and the lower reinforcing wall 6) act to ensure the section stiffness after the crushing of the primary crushing space V1, so that the risk of the V-shaped bending is reduced.

The bumper reinforcement R' as the comparison example of FIGS. 4E-4H, on the other hand, has a double-square shaped cross-section wherein a central portion in the height direction of the front wall 4 is supported by a partition wall. With this configuration, the collision reaction force sharply increases in the early stage of collision, and then, after buckling of the upper wall, lower wall, and partition wall, it drops (see FIG. 5).

Next, there will be described a process of energy absorption in a vertically offset collision, with reference to FIGS. 6A-7. Of these drawings, FIGS. 6C, 6D are views illustrating deformation states of the bumper reinforcement R' as the comparison example. FIG. 7 shows a graph in which the amount of advancement of the vehicle body from the time of contact with the collided object is plotted on the abscissa and the collision reaction force is plotted on the ordinate, wherein the symbols (a)-(d) arranged along the abscissa respectively correspond to the deformation states illustrated in FIGS. 6A-6D.

Figure 6A:
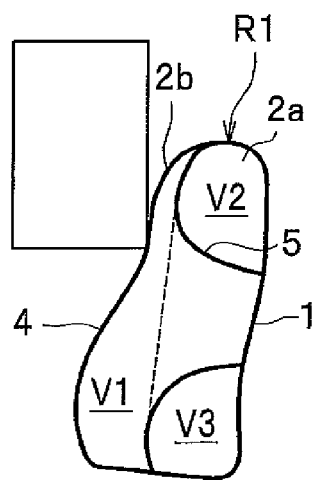
FIGS. 6A-6D are schematic views illustrating modes of deformation at the time of a vertically offset collision.
Figure 6C:
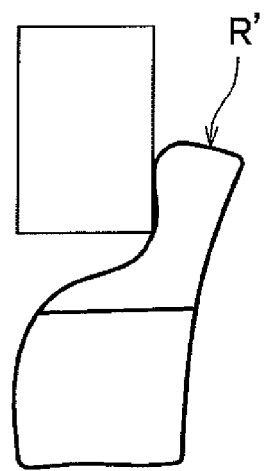
Figure 7:
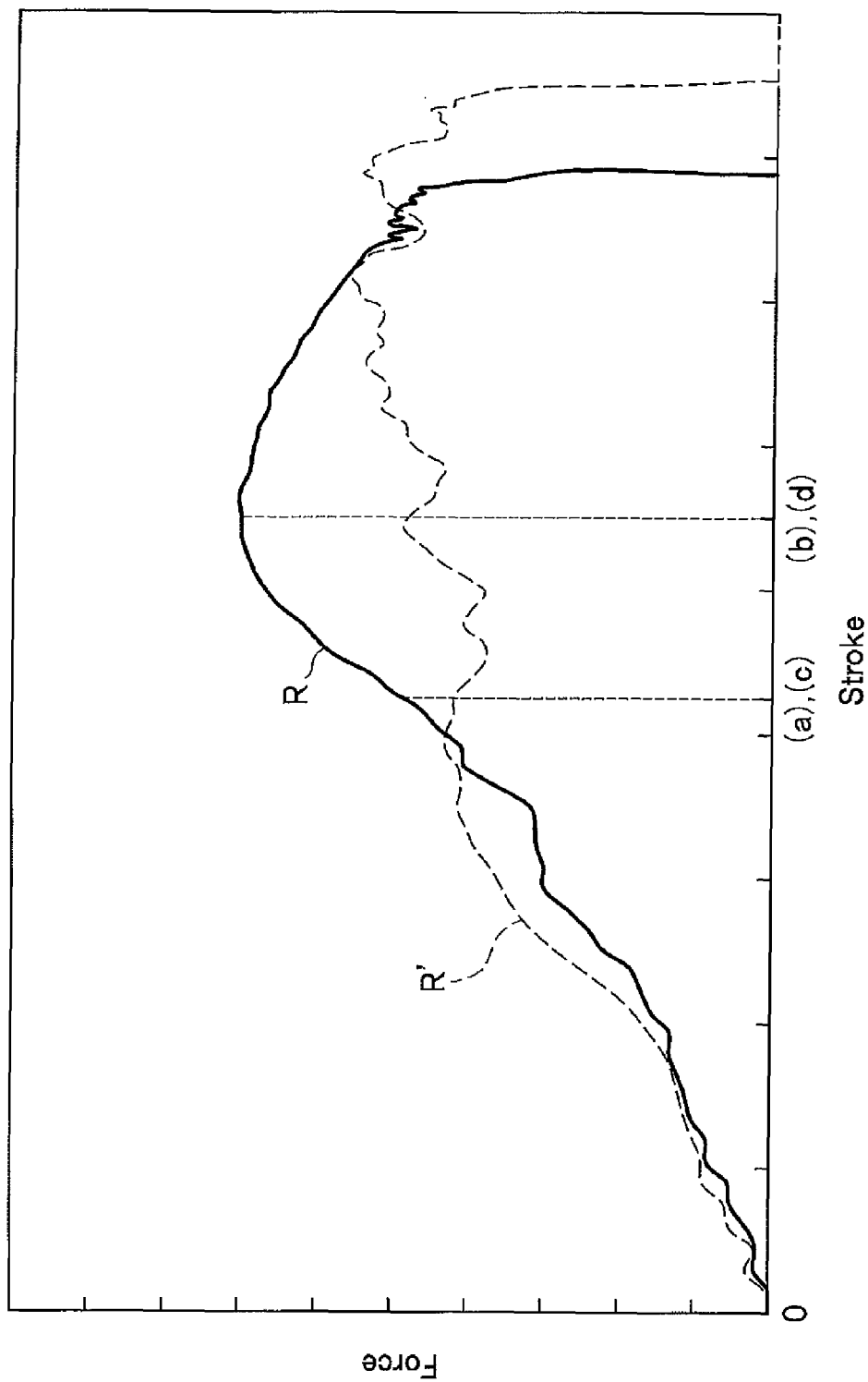
FIG. 7 shows a collision reaction force-displacement curve for the vertically offset collision.

If a collision load acts on the upper portion of the bumper reinforcement R1 in a vertically offset collision, then the upper-wall front portion 2b is deformed to come closer to the upper reinforcing wall 5 as illustrated in FIG. 6A, thereby causing the upper-wall rear portion 2a to be deformed to swell upwardly. In the early stage of collision, the upper portion of the primary crushing space V1 is crushed and thereby collision energy is absorbed while the secondary crushing spaces V2, V3 are still retaining their original shapes without being severely crushed. Since the upper-wall rear portion 2a is deformed to swell upwardly, a sufficient lap amount (contact area with the collided object) can be secured even from the early stage of collision onward.

Figure 6B:
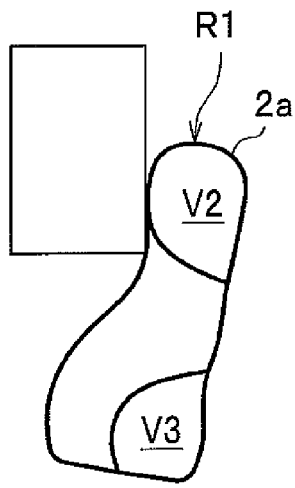
Figure 6D:
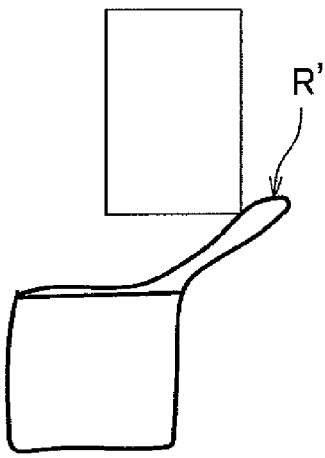

After the crushing of the upper portion of the primary crushing space V1, the collision load comes to act on the outer shell of the upper secondary crushing space V2 (the rear wall 1, the upper-wall rear portion 2a, and the upper reinforcing wall 5) as illustrated in FIG. 6B. The crushing of the upper secondary crushing space V2 causes collision energy to be absorbed. Furthermore, the presence of the upper secondary crushing space V2 and the lower secondary crushing space V3 increases the torsional rigidity of the bumper reinforcement R1, so that the bumper reinforcement can bear the collision load even after the crushing of the primary crushing space V1. In other words, as long as the outer shells of the upper secondary crushing space V2 and the lower secondary crushing space V3 are still retaining their shapes, the occurrences of a phenomenon that the bumper reinforcement R1 gets under the collided object and a phenomenon that it rides over the collided object can be reduced, and in consequence, energy absorption becomes possible through the deformation in which the bends of the bumper reinforcement R1 are extended rectilinearly (the beam deflection process).

If the collision load acts on an upper portion of the bumper reinforcement R' as the comparison example, on the other hand, the upper space is crushed and thereby collision energy is absorbed (see FIGS. 6C, 7). After the crushing of the upper space, however, because the bumper reinforcement R' has only insufficient torsional rigidity, the increase in the collision reaction force is less significant, compared to the case with the bumper reinforcement R1, so that a smaller amount of collision energy is absorbed.

As described above, according to the bumper reinforcement R1 of the present embodiment, the unpartitioned primary crushing space V1 is formed between the front wall 4 and the virtual line L, so that the front half portion of the bumper reinforcement R1 can be made less rigid, compared to the case where the central portion in the height direction of the front wall 4 is supported by a partition wall. In other words, according to the bumper reinforcement R1, the primary crushing space V1 is crushed promptly and preferentially in the early stage of collision. This allows lowering of the peak of the collision reaction force and further, a reduction in the gradient of the collision reaction force (the inclination of the collision reaction force-displacement curve).

Further, in the case of the vertically offset collision, after the upper or lower portion of the primary crushing space V1 is crushed and thereby collision energy in the early stage of collision is absorbed, the outer shell of either the upper secondary crushing space V2 or the lower secondary crushing space V3 acts to bear the collision load. Accordingly, the occurrences of the phenomenon that the bumper reinforcement R1 gets under the collided object and the phenomenon that it rides over the collided object can be reduced, and in consequence, energy absorption through the beam deflection process becomes possible.

According to the present embodiment, the front wall 4 is formed with the upper and lower bends at the two locations respectively in the height direction, so that the front wall 4 can form such a contact area with the collided object that gradually becomes larger, which prevents a sharp increase in the collision reaction force in the early stage of collision.

Further, the upper reinforcing wall 5 is formed of a part unbent in cross section and the rest curved in cross section, and the lower reinforcing wall 6 is formed of a part unbent in cross section and the rest curved in cross section, resulting in an appropriate section stiffness.

Moreover, since the upper curved portion 5b and the lower curved portion 6b are shaped in an arc curving outwardly toward the front wall 4 in cross section, the second moment of area of each of the upper reinforcing wall 5 and the lower reinforcing wall 6 is increased. That is, the rear half portion of the bumper reinforcement R1 becomes more difficult to crush and as a result, collision energy absorption in the "beam deflection process" is ensured.

Further, since the upper intersection P1 and the lower intersection P2 are located rearward of the virtual line L, the upper-wall front portion 2b and the lower-wall front portion 3b have longer buckling lengths and are easier to buckle. This allows lowering of the peak of the collision reaction force effectively in the early stage of collision and a reduction in the gradient of the collision reaction force.

Moreover, the upper-wall front portion 2b and the lower-wall front portion 3b are inclined downwardly and upwardly respectively so that the height H of the front wall 4 is made smaller than the distance between the upper intersection P1 and the lower intersection P2. As a result, the primary crushing space V1 can be crushed in an intended mode and can be a sufficient lap amount (contact area with the collided object), even in the vertically offset collision.

The bumper reinforcement R1 may have another cross section.

Figure 8A:
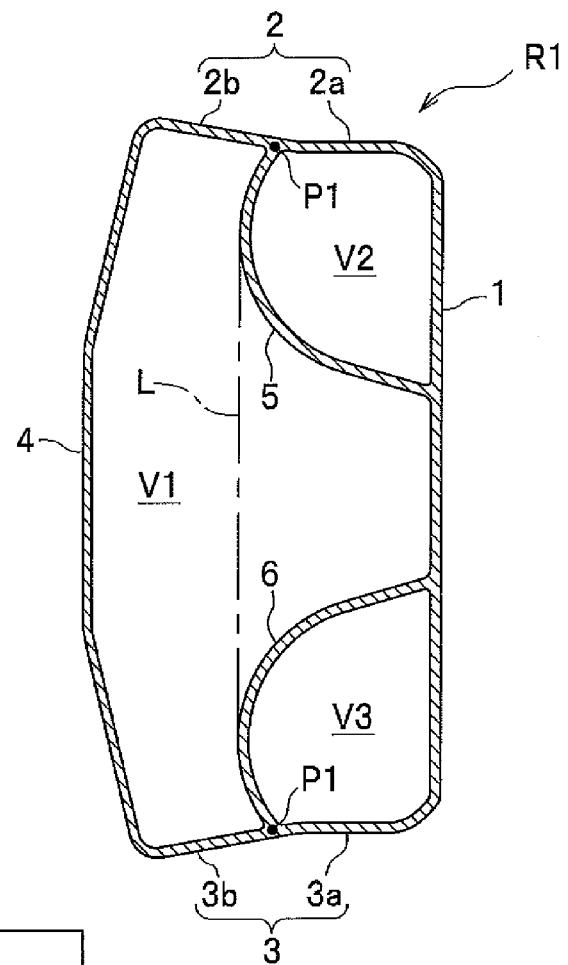
FIGS. 8A and 8B are views illustrating a modification of the bumper reinforcement according to the first embodiment.
Figure 8B:
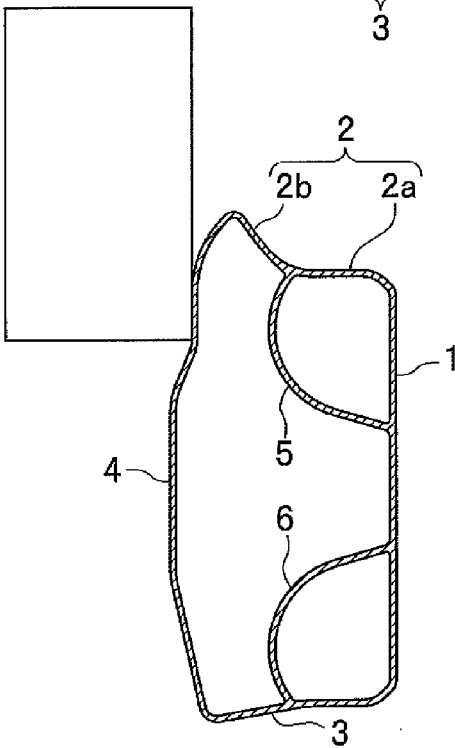

For example, as illustrated in FIG. 8A, the height of the front wall 4 may be made larger than the distance between the upper intersection P1 and the lower intersection P2, by inclining the upper-wall front portion 2b and the lower-wall front portion 3b upwardly and downwardly respectively. If the vertically offset collision causes a collision load to act for example on the upper portion of the bumper reinforcement R1, then the upper-wall front portion 2b is deformed to swell upwardly as illustrated in FIG. 8B. As a result, a sufficient lap amount is secured from the early stage of the vertically offset collision onward. As described above, also in the bumper reinforcement R1 of FIG. 8A, the primary crushing space V1 can be crushed in an intended mode and a sufficient lap amount can be secured in the vertically offset collision. In addition, after the crushing of the upper portion of the primary crushing space V1, the outer shell of the upper secondary crushing space acts to bear the collision load. Accordingly, as long as the outer shells of the upper secondary crushing space V2 and the lower secondary crushing space V3 are retaining their shapes, the beam deflection process can proceed.

If the collision load acts on the lower part of the bumper reinforcement R1, then the lower-wall front portion 3b is deformed to swell downwardly (illustration is omitted). As a result, a sufficient lap amount can be secured from the early stage of the vertically offset collision onward.

The front wall 4 is formed with the upper and lower bends respectively at the two locations in the height direction in the present embodiment. The front wall 4, however, may be unbent in cross section (that is, straight in cross section), as illustrated in FIG. 9A.

Figure 9A:
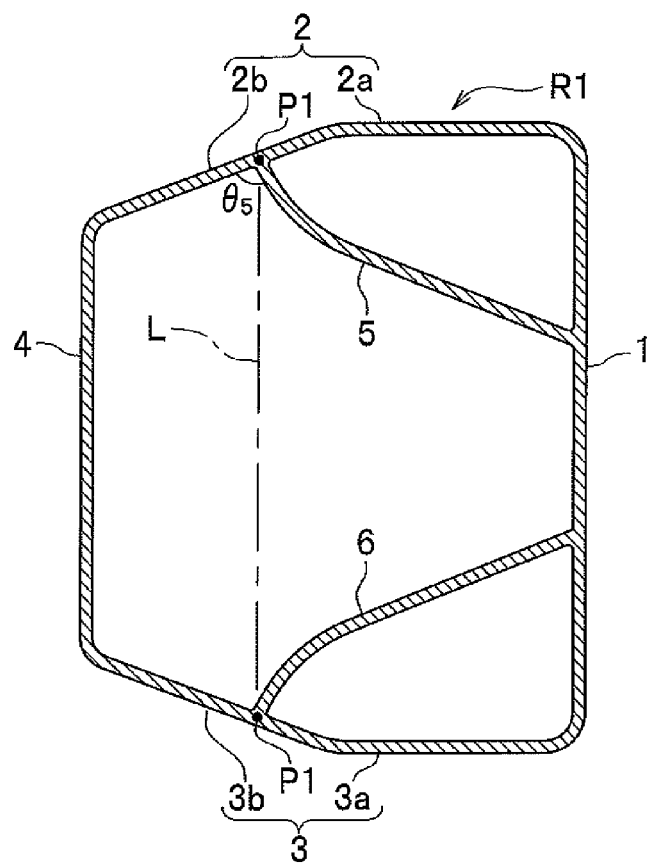
FIGS. 9A and 9B are cross sectional views of other modifications of the bumper reinforcement according to the first embodiment.

In FIG. 9A, the upper reinforcing wall 5 has an upper part which is curved in cross section and intersects the upper wall 2 at the same intersection of the virtual line L and the upper wall 2. The upper-wall front portion 2b and the upper reinforcing wall 5 form an angle (an interior angle) $\theta_5$ of 90 degrees or more. The same holds with the lower reinforcing wall 6. If the angle $\theta_5$ is set to less than 90 degrees and the upper intersection P1 and the lower intersection P2 are located rearward of the virtual line L, then the upper-wall front portion 2b and the lower-wall front portion 2b becomes easier to buckle, which in some cases, may results in an excessive reduction in the section stiffness of the bumper reinforcement R1. By setting the angle $\theta_5$ to 90 degrees or more and locating the upper intersection P1 and the lower intersection P2 at the same intersection of the virtual line L and the upper wall 2, however, the upper-wall front portion 2b and the lower-wall front portion 3b becomes shorter in buckling length (become more difficult to buckle), which prevents the excessive reduction in the section stiffness of the bumper reinforcement R1.

The upper reinforcing wall 5 is not joined with the lower reinforcing wall 6 in the present embodiment. A joint wall 8, however, may be provided to join the upper reinforcing wall 5 with the lower reinforcing wall 6 as illustrated in FIG. 9B.

Figure 9B:
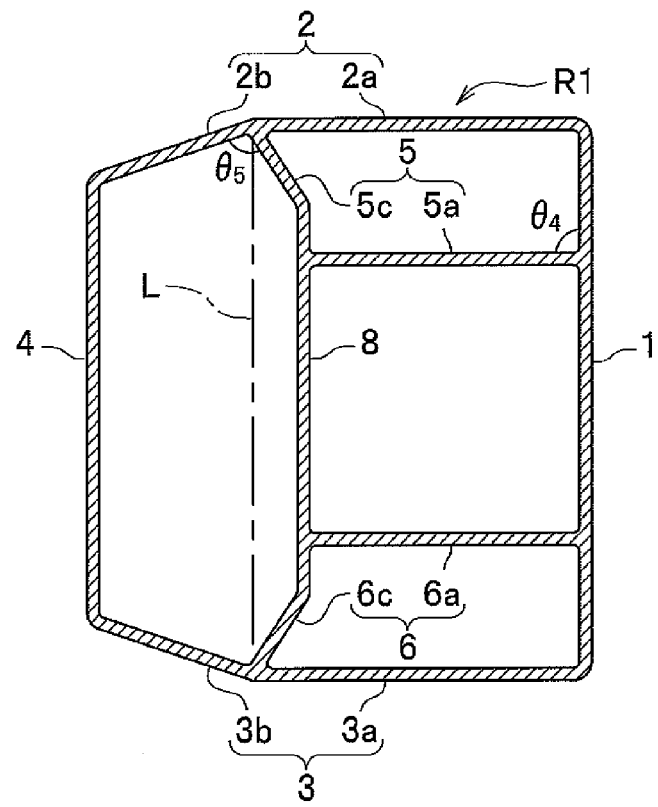

In FIG. 9B, the upper reinforcing wall 5 includes: the upper flat portion 5a extending forward from the rear wall 1; and an upper bent portion 5c extending from the front edge of the upper flat portion 5a up to the upper wall 2. The upper flat portion 5a is unbent in cross section and extends forward from a central part in the height direction of the rear wall 1. The rear wall 1 and the upper flat portion 5a form an angle (an interior angle) $\theta_4$ of 90 degrees. The upper bent portion 5c is angularly bent when viewed in a cross section and intersects the upper wall 2 at the same intersection of the virtual line L and the upper wall 2. The upper-wall front portion 2a and the upper bent portion 5c form an angle (an interior angle) $\theta_5$ of 90 degrees or more.

The lower reinforcing wall 6 is identical in cross section to the upper reinforcing wall 5 when inverted upside down and includes the lower flat portion 6a and a lower bent portion 6c.

Figure 10A:
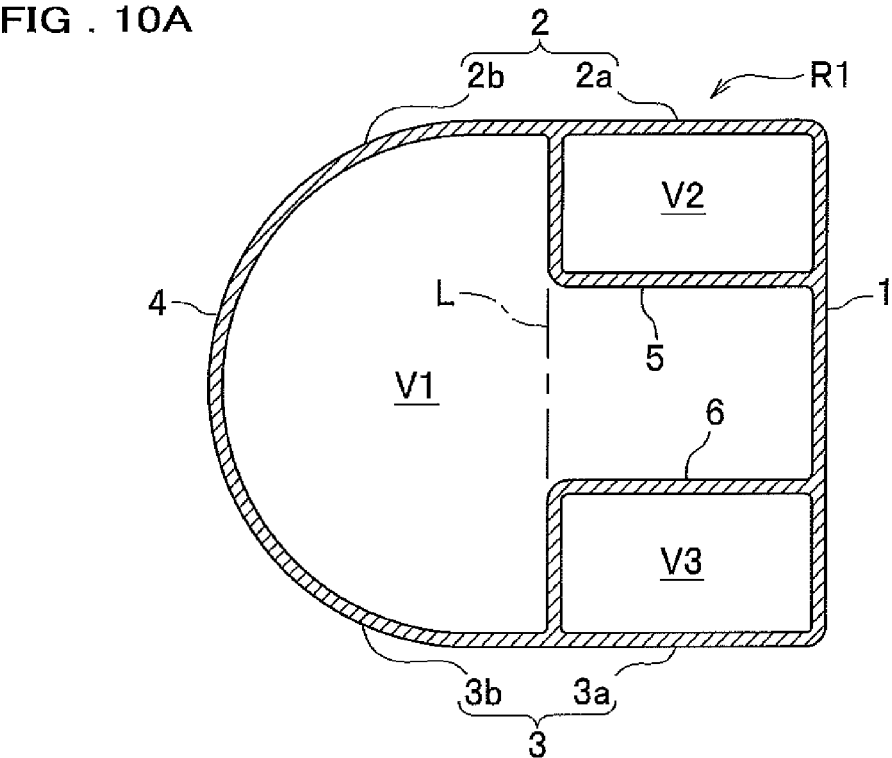
FIGS. 10A and 10B are cross sectional views of other modifications of the bumper reinforcement according to the first embodiment.
Figure 10B:
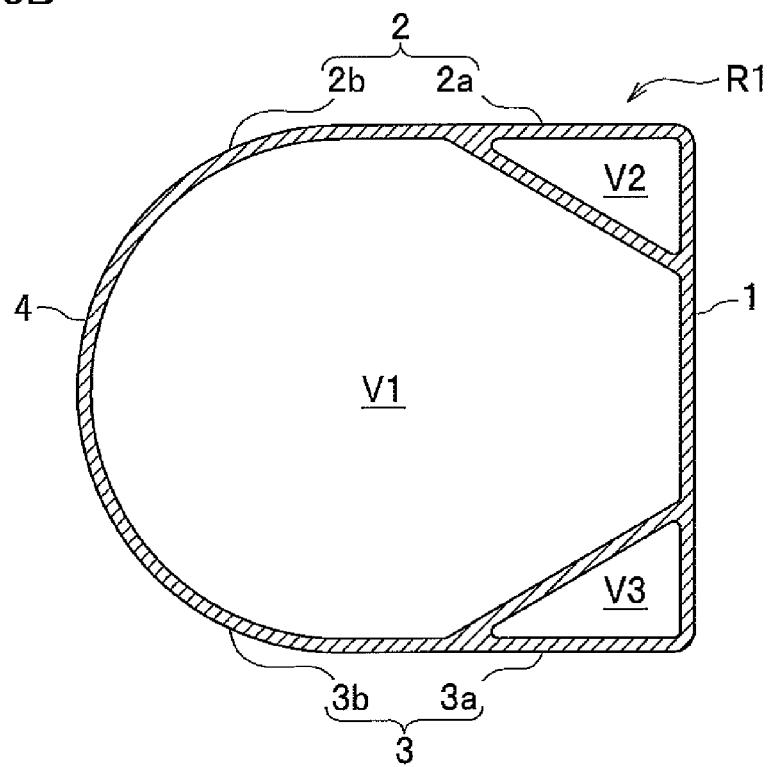

As illustrated in FIGS. 10A and 10B, the entire front wall 4 may be curved in cross section. In FIGS. 10A and 10B, the front wall 4 is arc-shaped in cross section and, of the upper-wall front portion 2b and the lower-wall front portion 3b, their respective portions joining to the front wall 4 are also arc-shaped in cross section.

In FIG. 10A, each of the upper reinforcing wall 5 and the lower reinforcing wall 6 has one bend and is L-shaped in cross section. Each of the upper secondary crushing space V2 and the lower secondary crushing space V3 has a rectangular cross section. In FIG. 10B, each of the upper reinforcing wall 5 and the lower reinforcing wall 6 is unbent in cross section (that is, straight), and each of the upper secondary crushing space V2 and the lower secondary crushing space V3 is triangular in cross section.

Figure 11A:
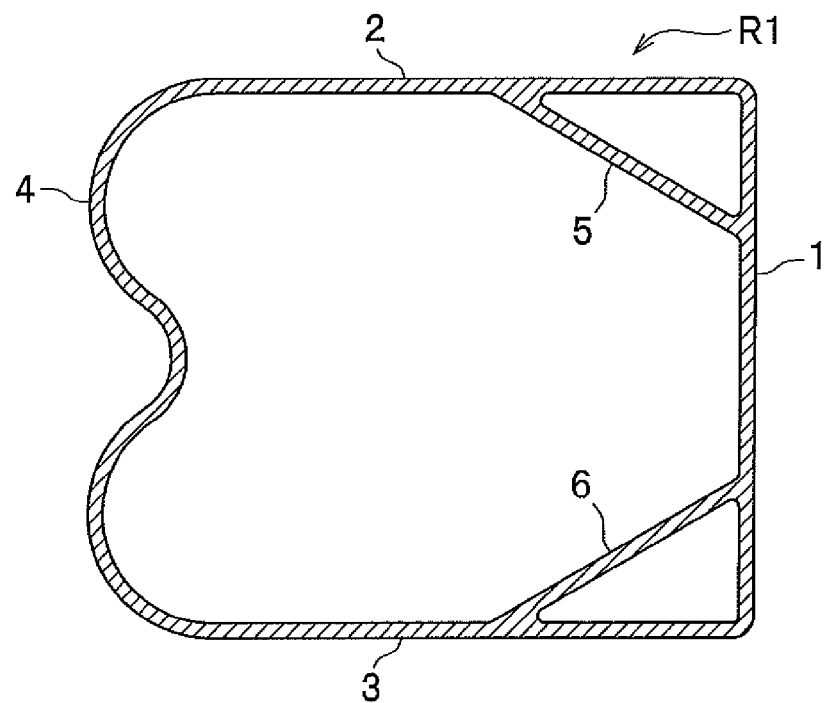
FIGS. 11A and 11B are cross sectional views of other modifications of the bumper reinforcement according to the first embodiment.

As illustrated in FIG. 11A, the front wall 4 may be wavy in cross section so that the front wall 4 can form such a contact area with the collided object that is small enough in the early stage of collision and then becomes larger as the collision proceeds, which results in an increased amount of collision energy absorbed, as well as a prevention of a sharp increase in the collision reaction force.

Figure 11B:
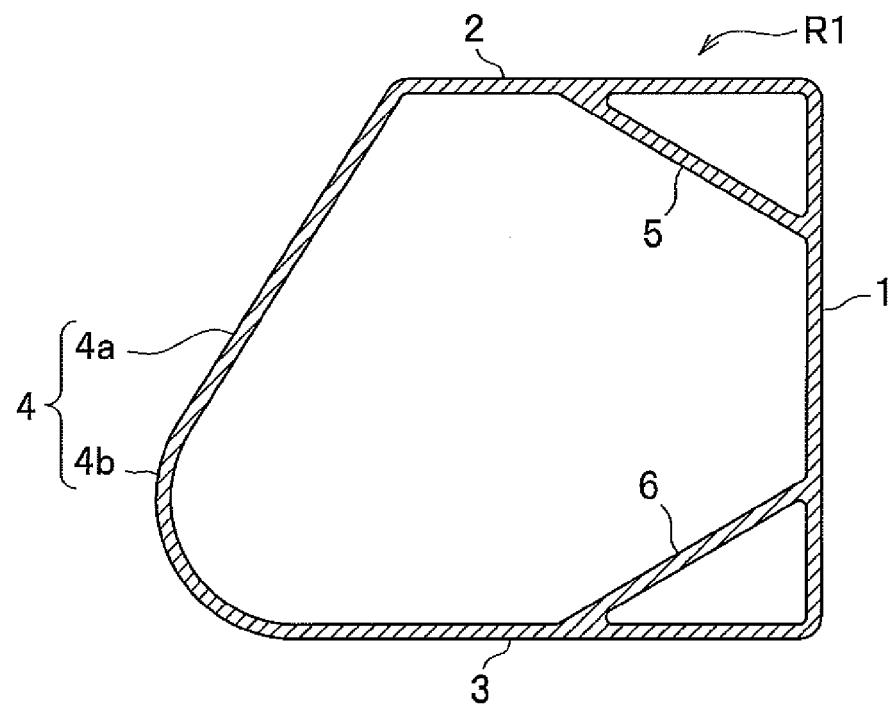

The bumper reinforcement R1 has upper and lower parts symmetrical to each other in cross section in the present embodiment. As illustrated in FIG. 11B, however, the bumper reinforcement R1 may be asymmetrical. In FIG. 11B, the front wall 4 includes: the front-wall upper portion 4a straight in cross section extending from the upper edge of the upper wall 2 diagonally downward to the front; and a front-wall lower portion 4b arc-shaped in cross section extending from the lower edge of the front-wall upper portion 4a to the front edge of the lower wall 3. In the bumper reinforcement R1 of FIG. 11B, the front-wall lower portion 4b is configured to form such a contact area with the collided object that becomes larger as the collision proceeds, which results in an increased amount of collision energy absorbed, as well as a prevention of a sharp increase in the collision reaction force.

Second Embodiment

Figure 12A:
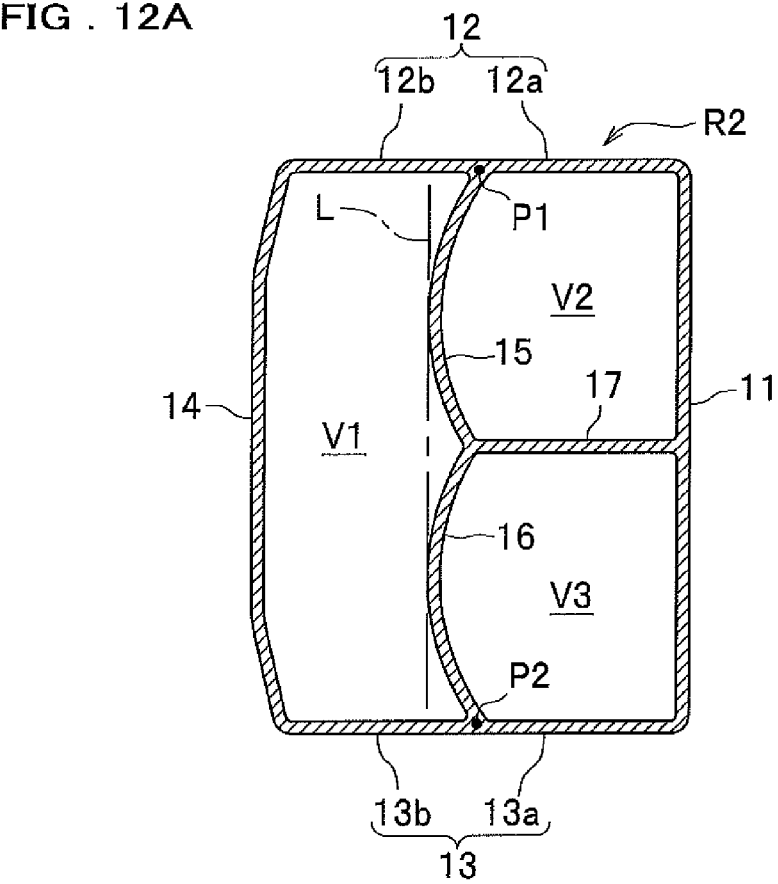
FIG. 12A is a cross sectional view of a bumper reinforcement according to a second embodiment of the present invention.

A bumper reinforcement R2 according to a second embodiment of the present invention is made of a hollow extruded material of an aluminum alloy. As illustrated in FIG. 12A, the bumper reinforcement R2 includes: a rear wall 11 facing the vehicle body; an upper wall 12 extending forward from the top of the rear wall 11; a lower wall 13 extending forward from the bottom of the rear wall 11; a front wall 14 supported only by the upper wall 12 and the lower wall 13; an upper reinforcing wall 15 supporting the middle in the front-rear direction of the upper wall 12; a lower reinforcing wall 16 supporting the middle in the front-rear direction of the lower wall 13; and a middle reinforcing wall 17 extending forward from the middle in the height direction of the rear wall 11.

In other words, the bumper reinforcement R2 includes: an outer shell having a closed cross section (the rear wall 11, the upper wall 12, the lower wall 13, and the front wall 14); and three partition walls arranged inside the inner space of the outer shell (the upper reinforcing wall 15, the lower reinforcing wall 16, and the middle reinforcing wall 17).

In FIG. 12A, the alternate long and short dash line L is a straight line L passing through the foremost of the upper reinforcing wall 15 and the foremost of the lower reinforcing wall 16. The point P1 is an intersection of the upper wall 12 and the upper reinforcing wall 15 (the upper intersection P1) and the point P2 is an intersection of the lower wall 13 and the lower reinforcing wall 16 (the lower intersection P2).

The rear wall 11 is unbent in cross section (that is, extends straight and parallel to the vertical line). The rear wall 11 has a rear surface to which are fixed the front ends of bumper stays.

The upper wall 12 includes: an upper-wall rear portion 12a extending from the upper edge of the rear wall 11 up to the upper intersection P1; and an upper-wall front portion 12b extending forward from the upper intersection P1. The upper-wall rear portion 12a and the upper-wall front portion 12b are both unbent and parallel to the horizontal plane.

The lower wall 13 includes: a lower-wall rear portion 13a extending from the lower edge of the rear wall 11 up to the lower intersection P2; and a lower-wall front portion 13b extending forward from the lower intersection P2. The lower-wall rear portion 13a and the lower-wall front portion 13b are both unbent and parallel to the horizontal plane.

The front wall 14 is located forward of the virtual line L and connects the upper wall 12 with the lower wall 13. The front wall 14 is bent at two locations in the height direction. The single unpartitioned space (a primary crushing space) V1 is formed between the front wall 14 and the virtual line L. The height of the front wall 14 is equal to the distance between the upper intersection P1 on the upper side and the lower intersection P2 on the lower side.

The upper reinforcing wall 15 is a part extending from the front edge of the middle reinforcing wall 17 up to the middle in the front-rear direction of the upper wall 12, and intersects the upper wall 12 at a location rearward of the virtual line L. In other words, the upper intersection P1 is located rearward of the virtual line L. The upper-wall front portion 12b and the upper reinforcing wall 15 form an angle (an interior angle) of less than 90 degrees. In cross section, the upper reinforcing wall 15 is shaped in an arc curving outwardly toward the front wall 14. The arc in shape of the upper reinforcing wall 15 is a circle segment with a center located within the space V2 enclosed with the rear wall 11, the upper wall 12, and the upper reinforcing wall 15 (the upper secondary crushing space V2). The upper secondary crushing space V2 is a single unpartitioned space.

The lower reinforcing wall 16 is a part extending from the front edge of the middle reinforcing wall 17 up to the middle in the front-rear direction of the lower wall 13, and intersects the lower wall 13 at a location rearward of the virtual line L. In other words, the lower intersection P2 is located rearward of the virtual line L. The lower-wall front portion 13b and the lower reinforcing wall 16 form an angle (an interior angle) of less than 90 degrees. In cross section, the lower reinforcing wall 16 is shaped in an arc curving outwardly toward the front wall 14. The arc in shape of the lower reinforcing wall 16 is a circle segment with a center located within the space V3 enclosed with the rear wall 11, the lower wall 13, and the lower reinforcing wall 16 (the lower secondary crushing space V3). The lower secondary crushing space V3 is a single unpartitioned space.

The middle reinforcing wall 17 has an unbent, flat-plate like shape and extends forward from the middle in the height direction of the rear wall 11. The rear wall 11 and the middle reinforcing wall 17 form an angle (an interior angle) of 90 degrees.

In consequence, in the bumper reinforcement R2 as well, the single unpartitioned primary crushing space V1 is formed between the front wall 14 and the virtual line L, so that the front half portion of the bumper reinforcement R2 can be made less rigid, compared to the case where the central portion in the height direction of the front wall 14 is supported by a partition wall. In other words, according to the bumper reinforcement R2, the primary crushing space V1 is crushed promptly and preferentially in the early stage of collision, which allows the peak of the collision reaction force to be lowered and allows the gradient of the collision reaction force (the inclination of the collision reaction force-displacement curve) to be reduced.

Further, in the case of a vertically offset collision, in the early stage of collision, the upper or lower portion of the primary crushing space V1 is crushed causing collision energy to be absorbed, and then, the outer shell of either the upper secondary crushing space V2 or the lower secondary crushing space V3 acts to bear the collision load. Accordingly, the occurrences of the phenomenon that the bumper reinforcement R2 gets under the collided object and the phenomenon that it rides over the collided object can be reduced, and in consequence, energy absorption through the beam deflection process becomes possible.

The bumper reinforcement R2 may have another cross section.

Figure 12B:
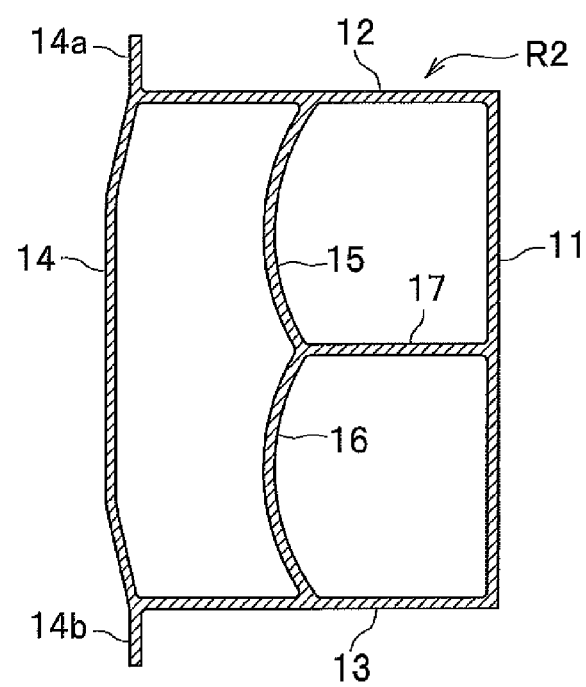
FIG. 12B is a cross sectional view of a modification of the bumper reinforcement according to the second embodiment.

For example, as illustrated in FIG. 12B, the front wall 14 may have an upper end portion 14a extended upward further than the intersection of the front wall 14 and the upper wall 12, and may have a lower end portion 14b extended downward further than the intersection with the lower wall 13 so that the upper end portion 14a and lower end portion 14b of the front wall 14 can be used respectively as flanges extending upward from the upper wall 12 and downward from the lower wall 13. With this configuration, in the vertically offset collision as well, a sufficient lap amount (contact area with the collided object) is secured.

The rear wall 11 may have an upper end portion extended upward further than the intersection with the upper wall 12 and may have a lower end portion extended downward further than the intersection with the lower wall 13 (illustration omitted).

As an example, FIG. 12 shows the bumper reinforcement R2 in which each of the upper reinforcing wall 15 and the lower reinforcing wall 16 is shaped in an arc curving outwardly toward the front wall 14. However, the bumper reinforcement R2 may have bent portions, as illustrated in FIG. 13.

Figure 13:
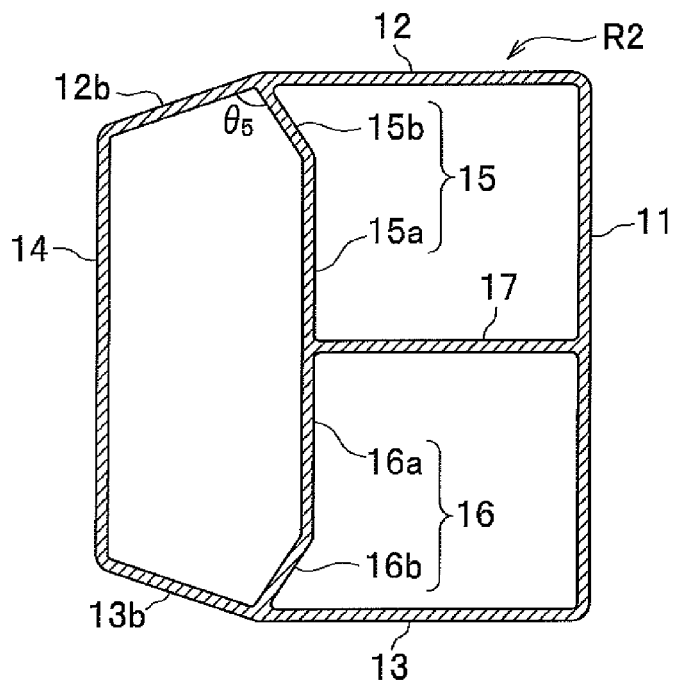
FIG. 13 is a cross sectional view of another modification of the bumper reinforcement according to the second embodiment.

In FIG. 13, the upper reinforcing wall 15 includes: an upper facing portion 15a parallel to the rear wall 11; and an upper inclined portion 15b extending from the upper edge of the upper facing portion 15a diagonally upward to the front. The upper-wall front portion 12b and the upper inclined portion 15b form an angle (an interior angle) $\theta_5$ of 90 degrees or more. The lower reinforcing wall 16 includes: a lower facing portion 16a parallel to the rear wall 11; and a lower inclined portion 16b extending from the lower edge of the lower facing portion 16a diagonally downward to the front. The lower-wall front portion 13b and the lower inclined portion 16b form an angle (an interior angle) of 90 degrees or more.

Third Embodiment

Figure 14:
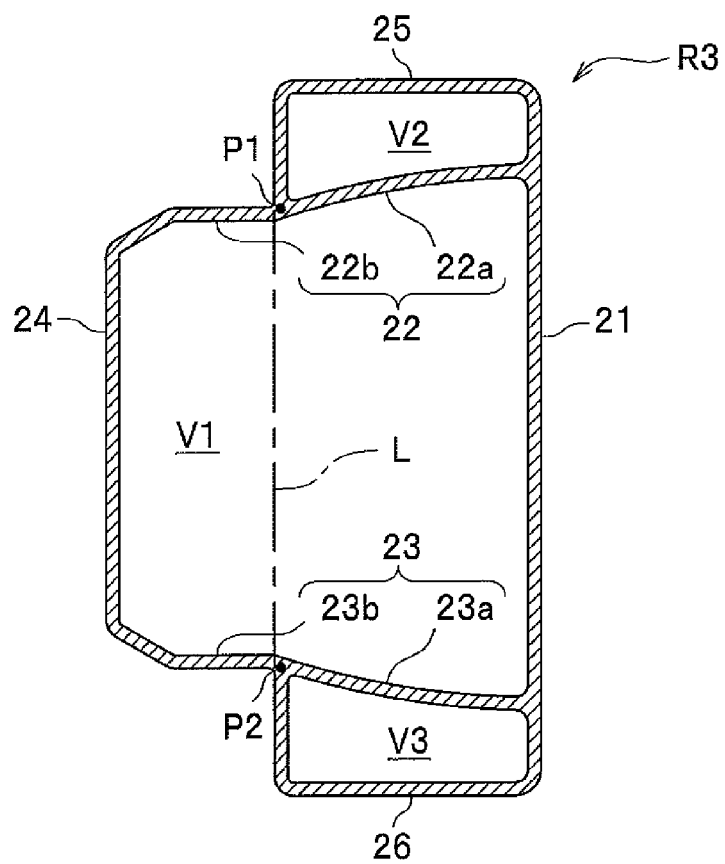
FIG. 14 is a cross sectional view of a bumper reinforcement according to a third embodiment of the present invention.

A bumper reinforcement R3 according to a third embodiment of the present invention is made of a hollow extruded material of an aluminum alloy. As illustrated in FIG. 14, the bumper reinforcement R2 includes: a rear wall 21 facing the vehicle body; an upper wall 22 extending forward from the top of the rear wall 21; a lower wall 23 extending from the bottom of the rear wall 11; a front wall 24 supported only by the upper wall 22 and the lower wall 23; an upper reinforcing wall 25 extending from the rear wall 21 up to the middle in the front-rear direction of the upper wall 22; and a lower reinforcing wall 26 extending the rear wall 21 up to the middle in the front-rear direction of the lower wall 23.

In other words, the bumper reinforcement R2 includes: an outer shell having a closed cross section (the rear wall 21, the upper wall 22, the lower wall 23, and the front wall 24); the upper reinforcing wall 25 and the lower reinforcing wall 26 arranged outside the outer shell.

In FIG. 14, the alternate long and short dash line L is the virtual line L passing through the foremost of the upper reinforcing wall 25 and the foremost of the lower reinforcing wall 26. The point P1 is an intersection of the upper wall 22 and the upper reinforcing wall 25 (the upper intersection P1) and the point P2 is an intersection of the lower wall 23 and the lower reinforcing wall 26 (the lower intersection P2).

The rear wall 21 is unbent in cross section (that is, extends straight and parallel to the vertical line). The rear wall 21 has an upper end portion extended upward further than the intersection with the upper wall 22 and a lower end portion extended downward further than the intersection with the lower wall 23.

The upper wall 22 includes: an upper-wall rear portion 22a extending from the top of the rear wall 21 up to the upper intersection P1; and an upper-wall front portion 22b extending forward from the upper intersection P1.

The upper-wall rear portion 22a extends from the top of the rear wall 21 diagonally downward to the front. The upper-wall rear portion 22a is arc-shaped in cross section.

The upper-wall front portion 22b includes: a flat part shaped like a flat plate extending along the horizontal plane from the front edge of the upper-wall rear portion 22a; and an inclined part extending forward from the front edge of the flat part diagonally downward. The inclined part forms a tilt angle of 45 degrees or less relative to the horizontal plane.

The lower wall 23 includes: a lower-wall rear portion 23a extending from the bottom of the rear wall 21 up to the lower intersection P2; a lower-wall front portion 23b extending forward from the lower intersection P2.

The lower-wall rear portion 23a extends from the bottom of the rear wall 21 diagonally upward to the front. The lower-wall rear portion 23a is arc-shaped in cross section.

The lower-wall front portion 23b includes: a flat part shaped like a flat plate extending along the horizontal plane from the front edge of the lower-wall rear portion 23a; an inclined part extending forward from the front edge of the flat part diagonally upward. The inclined part forms a tilt angle of 45 degrees or less relative to the horizontal plane.

The front wall 24 is located frontward of the virtual line L and connects the upper wall 22 and the lower wall 23. A single unpartitioned space (a primary crushing space) V1 is formed between the front wall 24 and the virtual line L. The front wall 24 has a height smaller than the distance between the upper intersection P1 on the upper side and the lower intersection P2 on the lower side.

The upper reinforcing wall 25 is a part extending from the upper edge of the rear wall 21 up to the middle in the front-rear direction of the upper wall 22, and is located above the upper wall 22. In other words, there is formed a space enclosed by the rear wall 21, the upper wall 22, and the upper reinforcing wall 25 and located above the upper wall 22 (the upper secondary crushing space V2). The upper reinforcing wall 25 is bent at one location so that it is L-shaped in cross section, but may be changed to another shape in cross section (for example, arc-shaped, straight, etc.).

The lower reinforcing wall 26 is a part extending from the lower edge of the rear wall 21 up to the middle in the front-rear direction of the lower wall 23, and is located underneath the lower wall 23. In other words, there is formed a space enclosed by the rear wall 21, the lower wall 23, and the lower reinforcing wall 26 and located underneath the lower wall 23 (the lower secondary crushing space V3). The lower reinforcing wall 26 is bent at one location so that it is L-shaped in cross section, but may be changed to another shape in cross section (for example, arc-shaped, straight, etc.).

In consequence, in the bumper reinforcement R3 as well, the single unpartitioned primary crushing space V1 is formed between the front wall 24 and the virtual line L, so that the front half portion of the bumper reinforcement R3 can be made less rigid, compared to the case where the central portion in the height direction of the front wall 24 is supported by a partition wall. In other words, according to the bumper reinforcement R3, the primary crushing space V1 is crushed promptly and preferentially in the early stage of collision, which allows the peak of the collision reaction force to be lowered and allows the gradient of the collision reaction force (the inclination of the collision reaction force-displacement curve) to be reduced.

Further, in the case of a vertically offset collision, in the early stage of collision, the upper or lower portion of the primary crushing space V1 is crushed causing collision energy to absorbed, and then, the outer shell of either the upper secondary crushing space V2 or the lower secondary crushing space V3 acts to bear the collision load. Accordingly, the occurrences of the phenomenon that the bumper reinforcement R3 gets under the collided object and the phenomenon that it rides over the collided object can be reduced, and in consequence, energy absorption in the beam deflection process becomes possible.

EXPLANATION OF REFERENCE NUMERALS

R1 bumper reinforcement
1 rear wall
2 upper wall
3 lower wall
4 front wall
5 upper reinforcing wall
6 lower reinforcing wall
8 joint wall
L virtual line
P1, P2 intersection
S bumper stay
R2 bumper reinforcement
11 rear wall
12 upper wall
13 lower wall
14 front wall
15 upper reinforcing wall
16 lower reinforcing wall
17 middle reinforcing wall
R3 bumper reinforcement
21 rear wall
22 upper wall
23 lower wall
24 front wall
25 upper reinforcing wall
26 lower reinforcing wall

The invention claimed is:

1. A bumper reinforcement made of a hollow material, comprising:
 a rear wall facing a vehicle body;
 an upper wall extending forward from a top of the rear wall;
 a lower wall extending forward from a bottom of the rear wall;
 a front wall supported only by the upper wall and the lower wall;
 an upper reinforcing wall extending from a middle in a height direction of the rear wall up to a middle in a front-rear direction of the upper wall; and
 a lower reinforcing wall extending from the middle in the height direction of the rear wall up to a middle in the front-rear direction of the lower wall, wherein:
 the front wall is located frontward of a virtual line passing through a foremost of the upper reinforcing wall and a foremost of the lower reinforcing wall in a cross section obtained by cutting the hollow material along a virtual plane having a central axis of the hollow material as a normal line.

2. The bumper reinforcement of claim 1, wherein:
an intersection of the upper wall and the upper reinforcing wall and an intersection of the lower wall and the lower reinforcing wall are located rearward of the virtual line.

3. The bumper reinforcement of claim 1, wherein:
the upper reinforcing wall comprises: an upper flat portion extending forward from the rear wall; and an upper curved portion extending from a front edge of the upper flat portion up to the upper wall, and
the lower reinforcing wall comprises: a lower flat portion located underneath the upper flat portion and extending forward from the rear wall; and a lower curved portion extending from a front edge of the lower flat portion up to the lower wall.

4. The bumper reinforcement of claim 3, wherein:
the upper curved portion and the lower curved portion are each shaped in an arc curving outwardly toward the front wall.

5. The bumper reinforcement of claim 1, wherein:
the front wall has a height smaller than a distance from an intersection of the upper wall and the upper reinforcing wall up to an intersection of the lower wall and the lower reinforcing wall.

6. The bumper reinforcement of claim 1, wherein:
the front wall has a height larger than a distance from an intersection of the upper wall and the upper reinforcing wall up to an intersection of the lower wall and the lower reinforcing wall.

7. The bumper reinforcement of claim 1, wherein: the upper reinforcing wall and the lower reinforcing wall are curved or bent in cross section.

8. The bumper reinforcement of claim 1, wherein: the front wall is curved or bent in cross section.

9. The bumper reinforcement of claim 2, wherein: the front wall is curved or bent in cross section.

10. The bumper reinforcement of claim 3, wherein: the front wall is curved or bent in cross section.

11. The bumper reinforcement of claim 4, wherein: the front wall is curved or bent in cross section.

12. The bumper reinforcement of claim 5, wherein: the front wall is curved or bent in cross section.

13. The bumper reinforcement of claim 6, wherein: the front wall is curved or bent in cross section.

* * * * *